US012803106B2

(12) United States Patent
Wang

(10) Patent No.: US 12,803,106 B2
(45) Date of Patent: Nov. 17, 2026

(54) BATTERY, POWER CONSUMPTION APPARATUS, METHOD AND APPARATUS FOR PREPARING BATTERY

(71) Applicant: CONTEMPORARY AMPEREX TECHNOLOGY (HONG KONG) LIMITED, Hong Kong (CN)

(72) Inventor: Zhi Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 540 days.

(21) Appl. No.: 18/494,988

(22) Filed: Oct. 26, 2023

(65) Prior Publication Data

US 2024/0243424 A1 Jul. 18, 2024

Related U.S. Application Data

(63) Continuation of application No. PCT/CN2022/071793, filed on Jan. 13, 2022.

(51) Int. Cl.
*H01M 50/342* (2021.01)
*H01M 10/643* (2014.01)
(Continued)

(52) U.S. Cl.
CPC ..... *H01M 50/3425* (2021.01); *H01M 10/643* (2015.04); *H01M 10/6556* (2015.04);
(Continued)

(58) Field of Classification Search
None
See application file for complete search history.

(56) References Cited

U.S. PATENT DOCUMENTS 10,916,744 B2 2/2021 Nakasawa et al.
2019/0181408 A1* 6/2019 Jang .................... H01M 50/375
(Continued)

FOREIGN PATENT DOCUMENTS

CN 103531852 A 1/2014
CN 208298909 U 12/2018
(Continued)

OTHER PUBLICATIONS

Extended European Search Report for EP application No. 22919419.6, dated Jul. 10, 2024.
(Continued)

*Primary Examiner* — Wyatt P Mcconnell
(74) *Attorney, Agent, or Firm* — Ladas & Parry LLP

(57) ABSTRACT

Embodiments of the present application provide a battery, a power consumption apparatus, and a method and an apparatus for preparing a battery. The battery includes a plurality of battery cells arranged in a first direction. Each battery cell is provided with a pressure relief mechanism, configured to be actuated when internal pressure or temperature of the battery cell reaches a threshold value, to relieve the internal pressure. The battery further includes a protecting plate, the protecting plate is attached to a surface of the battery cells arranged in the first direction. The protecting plate is provided with a plurality of openings, and an opening is provided corresponding to the pressure relief mechanism of a battery, to expose the pressure relief mechanism via the opening. Two openings corresponding to pressure relief mechanisms of two adjacent battery cells are provided in a staggered manner in the first direction.

12 Claims, 7 Drawing Sheets

(51) Int. Cl.

| | |
|---|---|
| ***H01M 10/6556*** | (2014.01) |
| ***H01M 10/658*** | (2014.01) |
| ***H01M 50/211*** | (2021.01) |
| ***H01M 50/24*** | (2021.01) |

(52) U.S. Cl.

CPC ....... *H01M 10/658* (2015.04); *H01M 50/211* (2021.01); *H01M 50/24* (2021.01); *H01M 2200/10* (2013.01); *H01M 2200/20* (2013.01); *H01M 2220/20* (2013.01)

(56) References Cited

U.S. PATENT DOCUMENTS

| | | | | |
|---|---|---|---|---|
| 2019/0348654 A1 | 11/2019 | Kuruma et al. | | |
| 2022/0059901 A1* | 2/2022 | Ren | .......................... | A62C 3/08 |
| 2023/0216126 A1* | 7/2023 | Yang | ........................ | B60K 1/04<br>429/62 |

FOREIGN PATENT DOCUMENTS

| | | | |
|---|---|---|---|
| CN | 109417146 | A | 3/2019 |
| CN | 110190211 | A | 8/2019 |
| CN | 110459710 | A | 11/2019 |
| CN | 211555951 | U | 9/2020 |
| CN | 211980711 | U | 11/2020 |
| CN | 113013531 | A | 6/2021 |
| EP | 3905368 | A1 | 11/2021 |
| JP | 2007073298 | A | 3/2007 |

OTHER PUBLICATIONS

International Search Report for International Application PCT/CN2022/071793, dated Sep. 28, 2022.

Written Opinion of International Search Authority for International Application PCT/CN2022/071793, dated Sep. 28, 2022.

Notice of First Examination Opinion, CN application No. 202280021316.1, Aug. 17, 2026.

* cited by examiner

BATTERY, POWER CONSUMPTION APPARATUS, METHOD AND APPARATUS FOR PREPARING BATTERY

CROSS-REFERENCE TO RELATED APPLICATION

This application is a continuation of International Application No. PCT/CN2022/071793, filed on Jan. 13, 2022, the disclosure of which is hereby incorporated by reference in its entirety.

TECHNICAL FIELD

The present application relates to the technical field of batteries, and in particular, to a battery, a power consumption apparatus, and a method and an apparatus for preparing a battery.

BACKGROUND

Energy saving and emission reduction is the key to a sustainable development of automotive industry. In this case, electric vehicles have become an important part of the sustainable development of the automotive industry due to their advantages of energy saving and environmental protection. For the electric vehicles, battery technology is also an important factor for their development.

With the development of the battery technology, various performances of a battery are constantly improving, among which, safety performance of the battery is particularly important. If the safety performance of the battery cannot be guaranteed, the battery cannot be used. Therefore, how to ensure the safety performance of the battery is an urgent technical problem to be solved in the battery technology.

SUMMARY

In view of the above problem, the present application provides a battery, a power consumption apparatus, a method and an apparatus for preparing a battery, which can enhance safety performance of the battery.

In a first aspect, the present application provides a battery, including a plurality of battery cells arranged in a first direction, where each battery cell is provided with a pressure relief mechanism, configured to be actuated when internal pressure or temperature of the battery cell reaches a threshold value, to relieve the internal pressure; and a protecting plate, where the protecting plate is attached to a surface of the battery cell provided with the pressure relief mechanism to protect the battery cell, the protecting plate is provided with a plurality of openings, and an opening is provided corresponding to the pressure relief mechanism to expose the pressure relief mechanism via the opening, and two openings corresponding to the pressure relief mechanisms of two adjacent battery cells are provided in a staggered manner in the first direction.

The opening is provided on the protecting plate of the battery in the staggered manner, and the pressure relief mechanism is only exposed via the opening on the protecting plate, which may be equivalent to that the pressure relief mechanism of the adjacent battery cell exposed via the opening on the protecting plate is provided in the staggered manner. When the pressure relief mechanisms of some battery cells are actuated and high-temperature and high-pressure substances inside the battery cells are discharged through the openings, the high-temperature and high-pressure substances are prevented from being directly sprayed onto the adjacent battery cell. In particular, it can enhance the safety performance of the battery by preventing the high-temperature and high-pressure substances from being directly sprayed onto the staggered opening on the adjacent battery cell, resulting in further thermal runaway issues.

In some embodiments, the plurality of openings are provided in one-to-one correspondence with a plurality of pressure relief mechanisms.

The opening on the protecting plate is in one-to-one correspondence with the pressure relief mechanism on the battery cell, which can prevent the high-temperature and high-pressure substances inside the battery cell from directly contacting the adjacent battery cell after being discharged from the pressure relief mechanism that does not correspond to the opening, thereby resulting in further thermal runaway issues. Ensure that the actuated pressure relief mechanism discharges the high-temperature and high-pressure substances inside the battery cell from the opening to enhance the safety performance of the battery.

In some embodiments, the battery cell is provided with the plurality of pressure relief mechanisms, some of the pressure relief mechanisms are provided corresponding to the openings, and others of the pressure relief mechanisms are covered by the protecting plate.

Some of the pressure relief mechanisms of the battery cell are provided corresponding to the openings, and the other pressure relief mechanisms are covered by the protecting plate, which may ensure that the actuated pressure relief mechanism is a pressure relief mechanism corresponding to the opening, such that the high-temperature and high-pressure substances inside the battery cell may be prevented from being directly sprayed onto the adjacent battery cell when discharged from the staggered pressure relief mechanism, resulting in further thermal runaway issues. Therefore, the safety performance of the battery can be enhanced.

In some embodiments, the battery cell is provided with at least three pressure relief mechanisms in a second direction, and the second direction is perpendicular to the first direction; and the pressure relief mechanisms located at both ends of the second direction of a first battery cell of the two adjacent battery cells in the first direction are provided corresponding to the openings, and other pressure relief mechanisms of a second battery cell of the two adjacent battery cells in the first direction are provided corresponding to the openings, except for the pressure relief mechanisms located at both ends of the second direction.

The battery cell is provided with at least three pressure relief mechanisms to ensure that a sufficient number of pressure relief mechanisms are exposed via the openings, such that when the internal pressure or temperature of the battery cell reaches the threshold value, the internal pressure of the battery cell can be quickly released through the sufficient number of pressure relief mechanisms to avoid a more serious explosion. At the same time, restricting the position of the pressure relief mechanisms exposed via the openings in the two adjacent battery cells can prevent the discharged high-temperature and high-pressure substances from being directly sprayed onto the adjacent battery cell after the pressure relief mechanism in the battery cell is actuated. In particular, it can enhance the safety performance of the battery by preventing the high-temperature and high-pressure substances from being directly sprayed onto the staggered opening on the adjacent battery cell, resulting in further thermal runaway issues.

In some embodiments, the battery cell has an arc-shaped outer wall, the pressure relief mechanism is provided on the arc-shaped outer wall, the protecting plate is provided with an arc-shaped portion, and the arc-shaped portion matches with the arc-shaped outer wall.

The arc-shaped portion of the protecting plate matches with the arc-shaped outer wall of the battery cell, such that when the protecting plate covers a surface of the battery cell, it may be positioned more accurately, ensuring that the pressure relief mechanism on the battery cell can be exposed via the opening on the protecting plate.

In some embodiments, the position and number of the pressure relief mechanisms provided on each of the plurality of battery cells are the same.

When the pressure or temperature inside the battery cell reaches the threshold value, the high-temperature and high-pressure substances inside the battery cell are more likely to be discharged from some of the pressure relief mechanisms corresponding to the openings, and are less likely to be discharged from the pressure relief mechanisms covered by the protecting plate, such that the high-temperature and high-pressure substances inside the battery cell may be prevented from being directly sprayed onto the adjacent battery cell when discharged from the staggered pressure relief mechanism, resulting in further thermal runaway issues. Therefore, the safety performance of the battery can be enhanced. At the same time, only one type of battery cell needs to be designed in a production process, and the position of the pressure relief mechanism is restricted by the opening on the protecting plate, which simplifies the production process and can avoid a problem of wrong arrangement of different types of battery cells, increasing production efficiency.

In some embodiments, the plurality of battery cells are bonded to the protecting plate.

By bonding the protecting plate to the battery cell, the plurality of battery cells may be fixed through the protecting plate, so as to improve strength of the battery cell and a battery cell group formed by the plurality of battery cells. At the same time, after being bonded to the battery cell, the protecting plate is not likely to fall off due to impact when the pressure relief mechanism releases the high-temperature and high-pressure substances inside the battery cell, such that the high-temperature and high-pressure substances inside the battery cell is only discharged from the pressure relief mechanism corresponding to the opening, and the high-temperature and high-pressure substances inside the battery cell are prevented from being directly sprayed onto the adjacent battery cell as much as possible, resulting in further thermal runaway issues. Therefore, the safety performance of the battery can be enhanced.

In some embodiments, the pressure relief mechanism is a weakened portion provided on a surface of the battery cell, such that when the internal pressure or temperature of the battery cell reaches the threshold value, the weakened portion is ruptured to relieve the internal pressure.

The process of providing the weakened portion on the surface of the battery cell is relatively simple and the cost is low. At the same time, when the pressure or temperature inside the battery cell reaches the threshold value, it is likely to be destroyed, and the pressure or temperature inside the battery cell can be released in time to avoid a more dangerous explosion. Therefore, the safety performance of the battery cell can be ensured.

In some embodiments, the protecting plate is made of a heat insulating material.

When the high-temperature and high-pressure substances are sprayed onto a surface of the protecting plate, the protecting plate made of the heat insulating material can prevent heat carried by the high-temperature and high-pressure substances from being transferred to the surface of the battery cell covered by the protecting plate, thereby avoiding further thermal runaway issues caused by the plurality of battery cells. Therefore, the safety performance of the battery cell can be ensured.

In some embodiments, the battery further includes: a thermal management component provided on one side of the plurality of battery cells away from the protecting plate, where the thermal management component is configured to accommodate a fluid to adjust temperature of the battery cell.

The thermal management component may adjust the temperature of the battery cell within a certain range, such that the battery including the plurality of battery cells can maintain the suitable temperature during use, improving the safety performance of the battery.

In some embodiments, a surface shape of the thermal management component matches a surface shape of the battery cell.

In this way, a contact area between the surface of the thermal management component and the surface of the battery cell is larger, which is more conducive to adjusting the temperature of the battery cell, such that the battery cell can maintain the suitable temperature during the use, ensuring the safety performance of the battery including the plurality of battery cells during the use. At the same time, it can also save space inside the battery, which is conducive to improving energy density of the battery.

In a second aspect, the present application provides a power consumption apparatus, including the battery in the above embodiments, where the battery is configured to supply electrical energy for the power consumption apparatus.

In a third aspect, the present application provides a method of preparing a battery, including providing a plurality of battery cells arranged in a first direction, where the battery cell is provided with a pressure relief mechanism, configured to be actuated when internal pressure or temperature of the battery cell reaches a threshold value, to relieve the internal pressure; and providing a protecting plate, where the protecting plate is attached to a surface of the battery cell provided with the pressure relief mechanism to protect the battery cell, the protecting plate is provided with a plurality of openings, and an opening is provided corresponding to the pressure relief mechanism to expose the pressure relief mechanism via the opening, and two openings corresponding to the pressure relief mechanisms of two adjacent battery cells are provided in a staggered manner in the first direction.

In a fourth aspect, the present application provides an apparatus for preparing a battery, including a first provision module configured to provide a plurality of battery cells arranged in a first direction, where the battery cell is provided with a pressure relief mechanism, configured to be actuated when internal pressure or temperature of the battery cell reaches a threshold value, to relieve the internal pressure; and a second provision module configured to provide a protecting plate, where the protecting plate is attached to a surface of the battery cell provided with the pressure relief mechanism to protect the battery cell, the protecting plate is provided with a plurality of openings, and an opening is provided corresponding to the pressure relief mechanism to expose the pressure relief mechanism via the opening, and two openings corresponding to the pressure relief mechanisms of two adjacent battery cells are provided in a staggered manner in the first direction.

BRIEF DESCRIPTION OF DRAWINGS

In order to illustrate technical solutions in embodiments of the present application more clearly, brief description will be made below to the drawings required in the embodiments of the present application. Apparently, the drawings described below are some embodiments of the present application only, and other drawings could be obtained based on these drawings by those ordinary skilled in this field without creative efforts.

Figure 1:
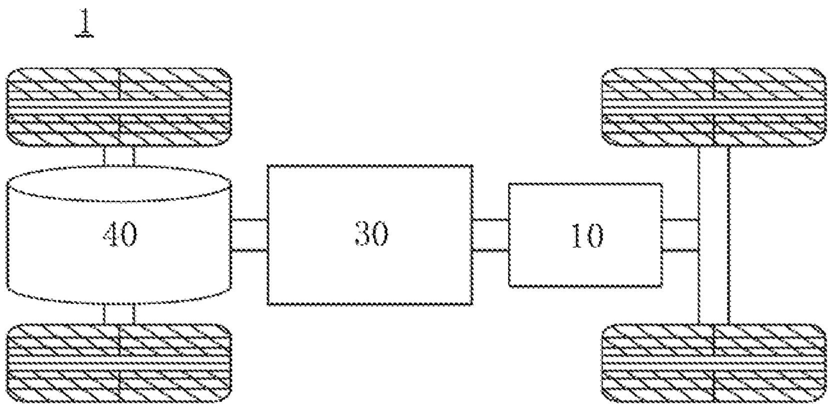
FIG. 1 is a schematic structural diagram of a vehicle according to some embodiments of the present application.

In the accompanying drawings, the drawings are not drawn to actual scale.

DETAILED DESCRIPTION

The following describes implementations of the present application in detail with reference to accompany drawings and embodiments. The detailed description of the following embodiments and the accompanying drawings are used to illustrate principles of the present application by example, and cannot be used to limit the scope of the present application, that is, the present application is not limited to the described embodiments.

In the description of the present application, it should be noted that unless otherwise provided, “a plurality of” means more than two; the terms “above”, “below”, “left”, “right”, “outside”, “inside” and the like are orientations or positional relationship, and the terms are merely for convenience of describing the present application and for simplifying the description, but for indicating or implying that an indicated apparatus or element must have a specific orientation, and must be constructed and operated in a specific orientation, which thus may not be understood as limiting the present application. In addition, the terms “first”, “second”, “third” and the like are only intended for a purpose of description, and shall not be understood as an indication or implication of relative importance. “Vertical” is not strictly vertical, but within the allowable range of error. “Parallel” is not strictly parallel, but within the allowable range of error.

The orientation words in the following description are the directions shown in the figures, and are not intended to limit the specific structure of the present application. In the description of the present application, it should be further noted that, unless explicitly specified and defined otherwise, terms “installation”, “interconnection”, and “connection” should be understood broadly, for example, they may either be a fixed connection, or a detachable connection, or an integrated connection; and they may either be a direct connection, or an indirect connection through an intermediary. Those of ordinary skill in the art can appreciate the specific meanings of the foregoing terms in the present application according to specific conditions.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not form any limitation to the present application.

In the present application, a battery cell may include a lithium-ion secondary battery, a lithium-ion primary battery, a lithium-sulfur battery, a sodium/lithium-ion battery, a sodium-ion battery or a magnesium-ion battery and the like, which is not limited by the embodiments of the present application. The battery cell may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which is not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent a liquid or other foreign matters from affecting the charging or discharging of the battery cell.

The battery cell includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active substance layer. The positive electrode active substance layer is coated on a surface of the positive electrode current collector, the positive electrode current collector not coated with the positive electrode active substance layer protrudes from the positive electrode current collector coated with the positive electrode active substance layer, and the positive electrode current collector not coated with the positive electrode active substance layer is used as a positive electrode tab. As an example, in a lithium-ion battery, a material of the positive electrode current collector may be aluminum, and a positive electrode active substance may be lithium cobaltate, lithium iron phosphate, ternary lithium, lithium manganate and the like. The negative electrode sheet includes a negative electrode current collector and a negative active substance layer. The negative active substance layer is coated on a surface of the negative electrode current collector, and the negative current collector not coated with the negative active substance layer protrudes from the negative current collector coated with the negative active substance layer, and the negative electrode current collector not coated with the negative electrode active substance layer is used as a negative electrode tab. A material of the negative electrode current collector may be copper, and a negative electrode active substance may be carbon, silicon and the like. In order to ensure that no fusing occurs when a large current passes, there are a plurality of positive electrode tabs which are stacked together, and there are a plurality of negative electrode tabs which are stacked together. A material of the separator may be polypropylene (PP), polyethylene (PE) and the like. In addition, the electrode assembly may be a winding structure or a laminated structure, and the embodiments of the present application are not limited thereto.

In order to meet different power demands, the battery may include a plurality of battery cells, where the plurality of battery cells may be in series connection, parallel connection or series-parallel connection. The series-parallel connection refers to a combination of series connection and parallel connection. Optionally, the plurality of battery cells may be first connected in series, in parallel or in series and parallel to form a battery module, and then a plurality of battery modules are connected in series, in parallel or in series and parallel to form a battery. That is, the plurality of battery cells may directly form the battery, or may first form the battery module, and then battery modules form the battery. The battery is further provided in a power consumption device for supplying electrical energy for the power consumption device.

With the development of the battery technology, it is necessary to consider many design factors at the same time, such as energy density, cycle life, discharge capacity, C-rate and other performance parameters. In addition, safety of the battery should also be considered.

With respect to the battery, the main safety hazard comes from the charging and discharging process, and in order to improve the safety performance of the battery, the battery cell is generally provided with a pressure relief mechanism. The pressure relief mechanism refers to an element or component that is actuated when internal pressure or temperature of the battery cell reaches a predetermined threshold value, to relieve the internal pressure. The predetermined threshold value may be adjusted according to different design requirements. The predetermined threshold may depend on the material of one or more of the positive electrode sheet, the negative electrode sheet, the electrolytic solution and the separator in the battery cell. The pressure relief mechanism may adopt such as pressure-sensitive or temperature-sensitive elements or components, that is, when the internal pressure or temperature of the battery cell reaches the predetermined threshold value, the press relief mechanism is actuated, thereby forming a channel for reliving the internal pressure.

The "actuation" mentioned in the present application means that the pressure relief mechanism acts, such that the internal pressure and temperature of the battery cell is relieved. The actions generated by the pressure relief mechanism may include but are not limited to: at least a part of the pressure relief mechanism being fractured, torn or melted, and so on. After the pressure relief mechanism is actuated, high-temperature and high-pressure substances inside the battery cell are discharged as emissions from the pressure relief mechanism. In this way, the pressure in the battery cell can be relieved at the controllable pressure or temperature, thereby avoiding potentially more serious accidents.

The emissions from the battery cell mentioned in the present application include but are not limited to: the electrolytic solution, dissolved or split positive and negative electrode sheets, fragments of the separator, high-temperature and high-pressure gas generated by reaction, flame and the like.

The pressure relief mechanism on the battery cell has an important influence on the safety of the battery. For example, when short circuit, overcharge and other phenomena occur in the battery cell, it may lead to thermal runaway inside the battery cell, resulting in a sudden increase in pressure or temperature. In this case, the internal pressure and temperature may be released outward through the actuation of the pressure relief mechanism, to prevent the battery cell from exploding and catching fire.

The plurality of battery cells are usually provided in the battery, and the plurality of battery cells are often closely arranged. When the pressure relief mechanisms of some battery cells are actuated, the high-temperature and high-pressure substances discharged from the pressure relief mechanism outward are easily sprayed onto the adjacent battery cell. As a result, the temperature of the adjacent battery cell increases, resulting in further thermal runaway issues.

In view of this, the present application provides a battery, including a protecting plate attached to a surface of a battery cell on which a pressure relief mechanism is provided, where the protecting plate has openings provided in a staggered manner in a direction along which the battery cells are arranged, such that the pressure relief mechanisms of a plurality of battery cells are exposed in the staggered manner in the direction along which the battery cells are arranged via the openings. Therefore, even if the high-temperature and high-pressure substances are discharged after the pressure relief mechanism of the battery cell is actuated, it is difficult for these high-temperature and high-pressure substances to be directly sprayed onto the adjacent battery cell, avoiding further thermal runaway issues. Therefore, the safety performance of the battery can be enhanced.

The technical solutions described by the embodiments of the present application are applied to various power consumption devices using the battery. The power consumption devices may be vehicles, mobile phones, portable devices, laptops, ships, spacecraft, electric toys, electric tools and the like. The vehicles may be fuel vehicles, gas vehicles or new energy vehicles, and new energy vehicles may be pure electric vehicles, hybrid vehicles or extended-range vehicles and the like; the spacecraft include airplanes, rockets, space shuttles, spaceships and the like; the electric toys include fixed or mobile electric toys, such as game consoles, electric vehicle toys, electric ship toys and electric airplane toys; the electric tools include metal cutting electric tools, grinding electric tools, assembly electric tools and railway electric tools, such as electric drills, electric grinders, electric wrenches, electric screwdrivers, electric hammers, impact drills, concrete vibrators, and electric planers. The embodiments of the present application do not make special limitations on the above power consumption devices.

In the following embodiments, for the convenience of description, a vehicle is used as an example of a power consumption device for illustration.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle and the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 may be used as an operation power supply of the vehicle 1 and is configured for a circuit system of the vehicle 1, for example, for a working power demand of the vehicle 1 during startup, navigation and running. In another embodiment of the present application, the battery 10 may be used not only as the operation power supply of the vehicle 1 but also as a driving power supply of the vehicle 1, replacing or partially replacing fuel or natural gas to provide driving power for the vehicle 1.

In order to meet different power demands, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form a battery module, and then a plurality of battery modules are connected in series, in parallel or in series and parallel to form a battery. That is, the plurality of battery cells may directly form the battery, or may first form the battery modules, and then the battery modules form the battery.

Figure 2:
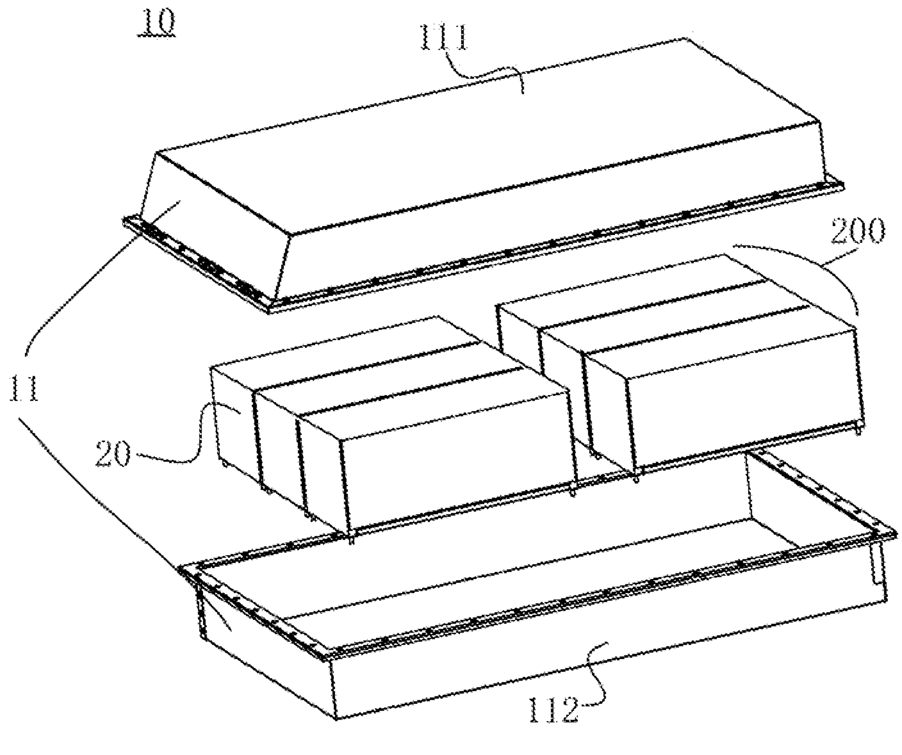
FIG. 2 is an exploded schematic structural diagram of a battery according to some embodiments of the present application.

For example, FIG. 2 shows a schematic structural diagram of a battery 10 according to an embodiment of the present application, and the battery 10 may include at least one battery module 200. The battery module 200 includes a plurality of battery cells 20. The battery 10 may further include a box body 11, the interior of the box body 11 is a hollow structure, and the plurality of battery cells 20 are accommodated in the box body 11. FIG. 2 shows a possible implementation manner of the box body 11 according to the embodiments of the present application. As shown in FIG. 2, the box body 11 may include two parts, which are referred to as a first box body part 111 and a second box body part 112, respectively, and the first box body part 111 and the second box body part 112 are fastened together. The shape of the first box body part 111 and the second box body part 112 may be determined according to the shape of the battery module 200, and at least one of the first box body part 111 and the second box body part 112 has an opening. For example, as shown in FIG. 2, the first box body part 111 and the second box body part 112 each may be a hollow cuboid and each has only one face as an opening face, the opening of the first box body part 111 is provided opposite to the opening of the second box body part 112, and the first box body part 111 and the second box body part 112 are fastened to each other to form the box body 11 with a closed cavity.

For another example, different from that shown in FIG. 2, the first box body part 111 and the second box body part 112 may have only one hollow cuboid with the opening, and the other is a plate shape to cover the opening. For example, in an example that the second box body part 112 is the hollow cuboid and has only one face as the opening face and the first box body part 111 is in the plate shape, the opening of the second box body part 112 is covered by the first box body part 111 to form the box body 11 with the closed cavity, and the cavity may be configured to accommodate the plurality of battery cells 20. The plurality of battery cells 20 are combined in parallel connection or series connection or series-parallel connection and are then placed in the box body 11 formed by fastening the first box body part 111 to the second box body part 112.

Optionally, the battery 10 may further include other structures, which is not repeated redundantly herein. For example, the battery 10 may further include a bus component. The bus component is configured to implement an electrical connection between the plurality of battery cells 20, such as parallel connection, series connection or series-parallel connection. Specifically, the bus component may implement the electric connection between the battery cells 20 by connecting electrode terminals of the battery cells 20. Furthermore, the bus component may be fixed to the electrode terminals of the battery cells 20 by means of welding. Electric energy of the plurality of battery cells 20 may be further led out through an electrically conductive mechanism passing through the box body 11.

According to different power demands, the number of the battery cells 20 in the battery module 200 may be set to any value. The plurality of battery cells 20 may be connected in series, in parallel or in series and parallel to implement larger capacity or power. Since there may be many battery cells 20 included in each battery 10, the battery cells 20 may be provided in groups for convenience of installation, and each group of battery cells 20 forms the battery module 200. The number of the battery cells 20 included in the battery module 200 is not limited and may be set according to the requirements.

The battery 10 may include a plurality of battery modules 200, and the battery modules 200 may be connected in series, in parallel or in series and parallel.

Hereinafter, a battery according to the embodiments of the present application will be introduced in detail with reference to FIG. 3 to FIG. 12.

Figure 3:
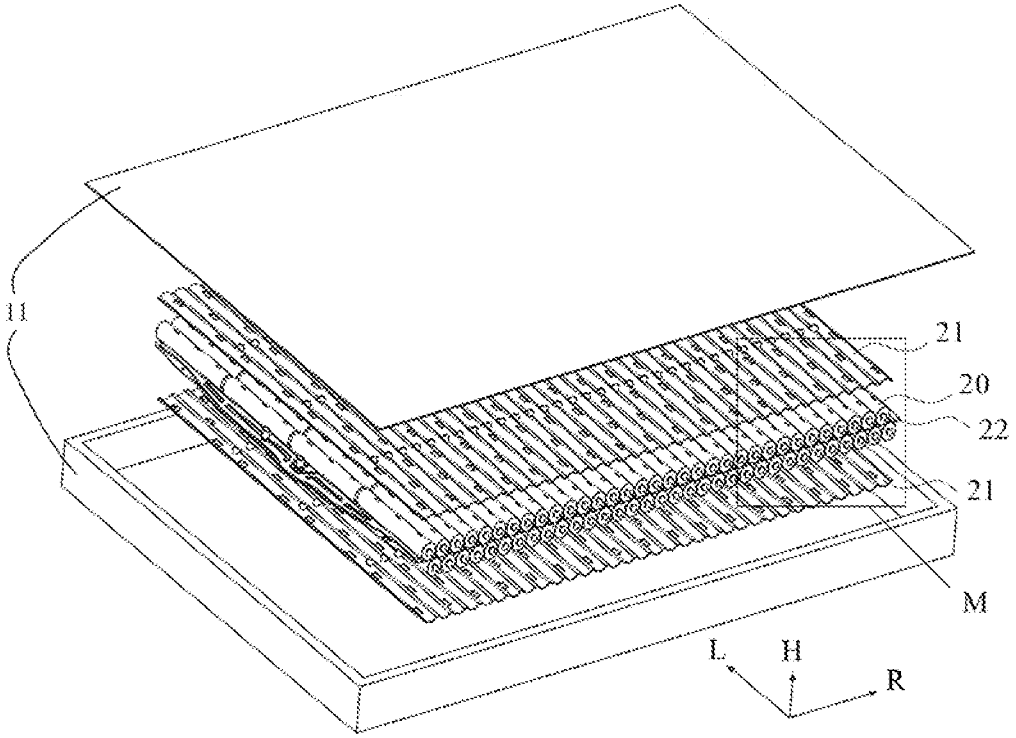
FIG. 3 is an exploded schematic structural diagram of a battery according to some embodiments of the present application.
Figure 4:
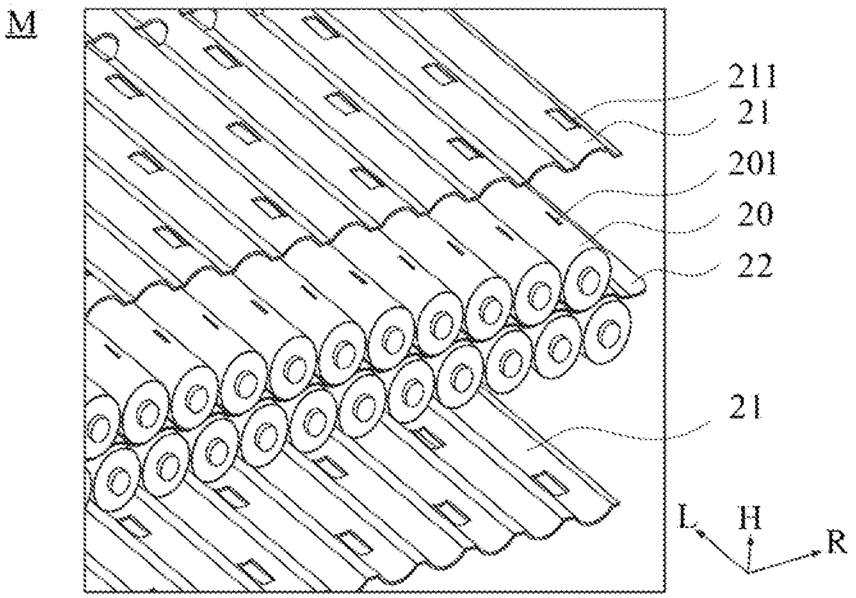
FIG. 4 is an enlarged view of part M in FIG. 3.

FIG. 3 is an exploded schematic structural diagram of a battery 10 according to some embodiments of the present application. The battery 10 shown in FIG. 3 includes a plurality of battery cells 20 arranged in a first direction R and a protecting plate 21. FIG. 4 is an enlarged view of part M in FIG. 3. As shown in FIG. 3 and FIG. 4, the battery cell 20 is provided with a pressure relief mechanism 201, configured to be actuated when internal pressure or temperature of the battery cell 20 reaches a threshold value, to relieve the internal pressure; and a protecting plate 21 attached to a surface of the battery cell 20 provided with the pressure relief mechanism 201 to protect the battery cell 20, where the protecting plate 21 is provided with a plurality of openings 211, and an opening 211 is provided corresponding to the pressure relief mechanism 201 to expose the pressure relief mechanism 201 via the opening 211, and two openings 211 corresponding to the pressure relief mechanisms 201 of two adjacent battery cells 20 are provided in a staggered manner in the first direction R.

For ease of understanding and description, the embodiments provided in the present application are only illustrated with a cylindrical battery cell 20. It should be understood that the embodiments provided in the present application are also applicable to a prismatic battery.

In the battery 10 shown in FIG. 3 and FIG. 4, the plurality of battery cells 20 are arranged in the first direction R, that is, the plurality of battery cells 20 are arranged side by side in the first direction R. Taking a battery cell being a cylindrical battery cell 20 as an example, the first direction R may be perpendicular to an axial direction of the cylindrical battery cell 20. The plurality of battery cells 20 arranged in the first direction R may be used as a battery module 200. In a possible implementation manner, a plurality of battery modules 200 may also be arranged in a second direction L, and the second direction L is parallel to an axis direction of the battery cell 20. In another possible implementation manner, the plurality of battery modules 200 may also be arranged in a third direction H, and the third direction H is perpendicular to a plane formed by the first direction R and the second direction L. It should be understood that the first direction R, the second direction L, and the third direction H pointed to by arrows in FIG. 3 are schematic and do not indicate specific orientations, that is, the first direction R, the second direction L, and the third direction H indicate directions parallel to a straight line where the arrows are located in the figure.

The battery cell 20 may be provided with a pressure relief mechanism 201 configured to be actuated when internal pressure or temperature of the battery cell 20 reaches a threshold value, to relieve the internal pressure. The pressure relief mechanism 201 may be in various possible pressure relief structures, which is not limited in the embodiments of the present application. For example, the pressure relief mechanism 201 may be a temperature-sensitive pressure relief mechanism configured to be capable of being melted when the internal temperature of the battery cell 20 provided with the pressure relief mechanism 201 reaches a threshold value; and/or the pressure relief mechanism 201 may be a pressure-sensitive pressure relief mechanism configured to be capable of being fractured when internal gas pressure of the battery cell 20 provided with the pressure relief mechanism 201 reaches a threshold value.

The protecting plate 21 is attached to the surface of the battery cell 20 provided with the pressure relief mechanism 201, configured to protect the battery cell 20. The protecting plate 21 may be provided with a plurality of openings 21, and the opening 211 is provided corresponding to the pressure relief mechanism 201. Therefore, when the plurality of battery cells 20 are arranged in the first direction R, the pressure relief mechanisms 201 of the plurality of battery cells 20 can form a plane, such that when the protecting plate 21 is attached to the surface of the battery cell 20, the pressure mechanism 201 can be exposed via the opening 211 on the protecting plate 21, in order that when the pressure relief mechanism 201 is actuated, the high-temperature and high-pressure substances inside the battery cell 20 may be discharged through the opening 211. When the plurality of battery modules 200 are arranged in the third direction H, for example to form a two-layer structure as shown in FIG. 3 and FIG. 4, a plurality of protecting plates 21 may also be provided, and each protecting plate 21 is attached to a surface of a layer of battery cells 20 provided with the pressure relief mechanism 201.

The opening 211 runs through the protecting plate 21 in a thickness direction of the protecting plate 21, such that when the protecting plate 21 is attached to the surface of the battery cell 20, the opening 211 can expose a part of the battery cell 20, specifically, the part of the battery cell 20 exposed via the opening 211 is provided with the pressure relief mechanism 201.

Figure 5:
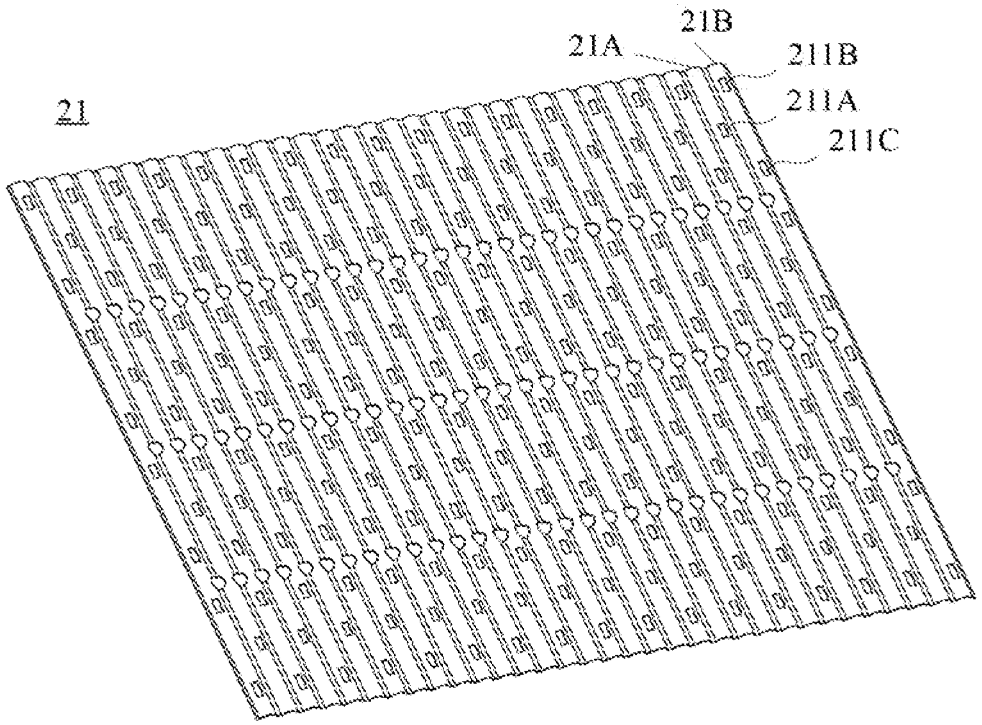
FIG. 5 is a schematic structural diagram of a protecting plate according to some embodiments of the present application.

In the first direction R, the corresponding openings 211 of the pressure relief mechanisms 201 of the two adjacent battery cells 20 are provided in the staggered manner, which may be shown in FIG. 5. FIG. 5 is a schematic diagram of a protecting plate 21 of a battery 10 according to the embodiments of the present application. Taking a first part 21A and a second part 21B of the protecting plate 21 in FIG. 5 as an example, the first part 21A and the second part 21B are adjacent on the protecting plate 21 and attached to two adjacent battery cells 20, respectively. The first part 21A is provided with a first opening 211A, and the second part 21B is provided with a second opening 211B and a third opening 211C. As can be seen from the figure, the first opening 211A is staggered with the second opening 211B and the third opening 211C, that is, on a straight line in the first direction R where the first opening 211A is located, the second part 21B of the protecting plate 21 is not provided with an opening 211. Similarly, on a straight line in the first direction R where the second opening 211B or the third opening 211C is located, the first part 21A of the protecting plate 21 is not provided with the opening 211. It should be understood that the number and position of the openings 211 shown in FIG. 5 are only examples and are not limited.

The opening 211 is provided on the protecting plate 21 of the battery 10 in the staggered manner, and the pressure relief mechanism 201 is only exposed via the opening 211 on the protecting plate 21, which may be equivalent to that the pressure relief mechanism 201 of the adjacent battery cell 20 exposed via the opening 211 on the protecting plate 21 is provided in the staggered manner. When the pressure relief mechanisms 201 of some battery cells 20 are actuated and the high-temperature and high-pressure substances inside the battery cells 20 are discharged through the openings 211, the high-temperature and high-pressure substances are prevented from being directly sprayed onto the adjacent battery cell 20. In particular, it can enhance the safety performance of the battery 10 by preventing the high-temperature and high-pressure substances from being directly sprayed onto the staggered opening 211 on the adjacent battery cell 20, resulting in further thermal runaway issues.

According to some embodiments of the present application, optionally, the battery cell 20 has an arc-shaped outer wall, the pressure relief mechanism 201 is provided on the arc-shaped outer wall, the protecting plate 21 is provided with an arc-shaped portion, and the arc-shaped portion matches with the arc-shaped outer wall.

The battery cell 20 may have the arc-shaped outer wall, such as a cylindrical battery cell 20. The pressure relief mechanism 201 of the battery cell 20 is provided on the arc-shaped outer wall, for example, may be provided on a tangent face parallel to a plane formed by the first direction R and the second direction L on the arc-shaped outer wall. The protecting plate 21 may also be provided with the matching arc-shaped portion. Correspondingly, the opening 211 on the protecting plate 21 is provided on the arc-shaped portion of the protecting plate 21, as shown in FIG. 3 to FIG. 5, for example, it may be provided on a tangential plane parallel to the plane formed by the first direction R and the second direction L on the arc-shaped portion, that is, the top of the arc-shaped portion. The radian of the arc-shaped portion provided on the protecting plate 21 may be designed according to the requirements.

The arc-shaped portion of the protecting plate 21 matches with the arc-shaped outer wall of the battery cell 20, such that when the protecting plate 21 covers a surface of the battery cell 20, it may be positioned more accurately, ensuring that the pressure relief mechanism 201 on the battery cell 20 can be exposed via the opening 211 on the protecting plate 21.

According to some embodiments of the present application, optionally, the plurality of openings 211 are provided in one-to-one correspondence with the plurality of pressure relief mechanisms 201.

In order to prevent the high-temperature and high-pressure substances discharged through the pressure relief mechanism 201 from being sprayed onto the adjacent battery cell 20 in the event of thermal runaway of the battery cell 20, causing the temperature of the adjacent battery cell 20 to rise, resulting in further thermal runaway issues, it is possible to provide the plurality of openings 211 on the protecting plate 21 in one-to-one correspondence with the plurality of pressure relief mechanisms 201. Therefore, the arrangement of the pressure relief mechanisms 201 on the plurality of battery cells 20 arranged in the first direction R is consistent with the arrangement of the openings 211 on the protecting plate 21. In this case, the pressure relief mechanisms 201 on the plurality of battery cells 20 arranged in the first direction R also need to be provided in the staggered manner in the first direction R.

Figure 6:
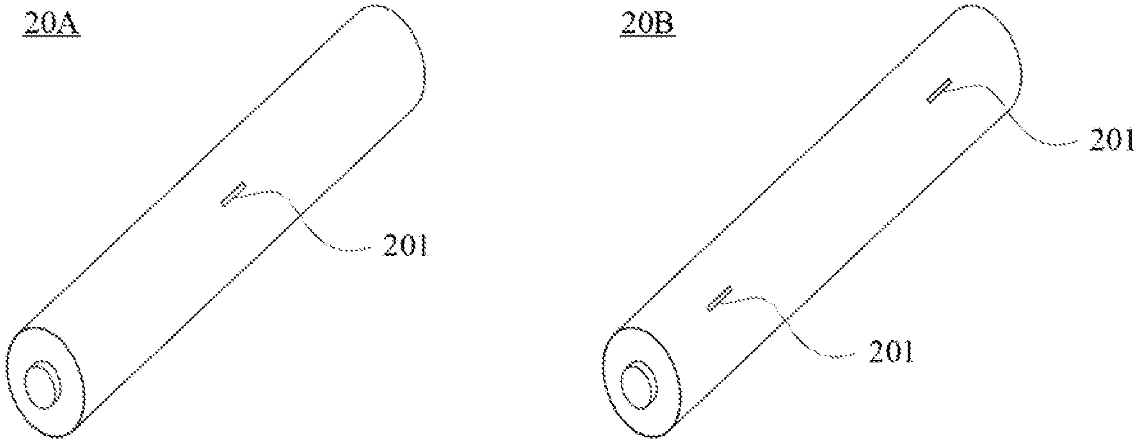
FIG. 6 is a schematic structural diagram of a first type of battery cell and a second type of battery cell according to some embodiments of the present application.

Taking FIG. 5 and FIG. 6 as an example, the first part 21A of the protecting plate 21 shown in FIG. 5 is provided with an opening 211, the second part 21B is provided with two openings 211, and the first opening 211A on the first part 21A is located in the middle of the first part 21A in the second direction L, and the second opening 211B and the third opening 211C on the second part 21B are located at both ends of the second part 21B in the second direction L.

FIG. 6 is a schematic structural diagram of a first type of battery cell 20A and a second type of battery cell 20B according to some embodiments of the present application. For example, a battery cell 20 in a battery 10 may include a first type of battery cell 20A and a second type of battery cell 20B. A pressure relief mechanism 201 on the first type of battery cell 20A is provided in the middle of the first type of battery cell 20A in the second direction L, and a pressure relief mechanism 201 on the second type of battery cell 20B is provided on both ends of the second type of battery cell 20B in the second direction L. Among them, the second direction L is an axial direction of a cylindrical battery cell 20, and "middle" and "both ends" refer to the "middle" and "both ends" on a side wall of the battery cell 20 in the axial direction. In the cylindrical battery cell 20, the side wall of the battery cell 20 is a cylindrical face of a cylinder.

When a plurality of battery cells 20 are arranged in the first direction R, the first type of battery cell 20A and the second type of battery cell 20B are provided at intervals, and correspond to the position of the opening 211 on the protecting plate 21 one by one. For example, the opening 211 on the first part 21A of the protecting plate 21 is provided in the middle of the first part 21A in the second direction L, then the battery cell 20 corresponding to the first part 21A is the first type of battery cell 20A; and the opening 211 on the second part 21B is provided on both ends of the second part 21B in the second direction L, and the battery cell 20 corresponding to the second part 21B is the second type of battery cell 20B.

The opening 211 on the protecting plate 21 is in one-to-one correspondence with the pressure relief mechanism 201 on the battery cell 20, which can prevent the high-temperature and high-pressure substances inside the battery cell 20 from directly contacting the adjacent battery cell 20 after being discharged from the pressure relief mechanism 201 that does not correspond to the opening 211, thereby resulting in further thermal runaway issues. Ensure that the actuated pressure relief mechanism 201 discharges the high-temperature and high-pressure substances inside the battery cell 20 from the opening 211 to enhance the safety performance of the battery 10.

According to some embodiments of the present application, optionally, the battery cell 20 is provided with the plurality of pressure relief mechanisms 201, some of the pressure relief mechanisms 201 are provided corresponding to the openings 211, and others of the pressure relief mechanisms 201 are covered by the protecting plate 21.

Each battery cell 20 in the plurality of battery cells 20 may be provided with the plurality of pressure relief mechanisms 201, and the total number of pressure relief mechanisms 201 of the plurality of battery cells 20 may be greater than the number of openings 211 on the protecting plate 21. The number and position of the openings 211 of the protecting plate 21 define the number and position of the actuated pressure relief mechanisms 201, so the pressure relief mechanism 201 not provided corresponding to the opening 211 is covered by the protecting plate 21. Compared with the pressure relief mechanism 201 covered by the protecting plate 21, the pressure relief mechanism 201 provided corresponding to the opening 211 is likely to be actuated when the pressure or temperature inside the battery cell 20 reaches the threshold value, and the high-temperature and high-pressure substances inside the battery cell 20 are discharged via the opening 211.

Some of the pressure relief mechanisms 201 of the battery cell 20 are provided corresponding to the openings 211, and the other pressure relief mechanisms 201 are covered by the protecting plate 21, which may ensure that the actuated pressure relief mechanism 201 is a pressure relief mechanism 201 corresponding to the opening 211, such that the high-temperature and high-pressure substances inside the battery cell 20 may be prevented from being directly sprayed onto the adjacent battery cell 20 when discharged from the staggered pressure relief mechanism 201, resulting in further thermal runaway issues. Therefore, the safety performance of the battery 10 can be ensured.

According to some embodiments of the present application, optionally, the position and number of the pressure relief mechanisms 201 provided on each of the plurality of battery cells 20 are the same.

Figure 7:
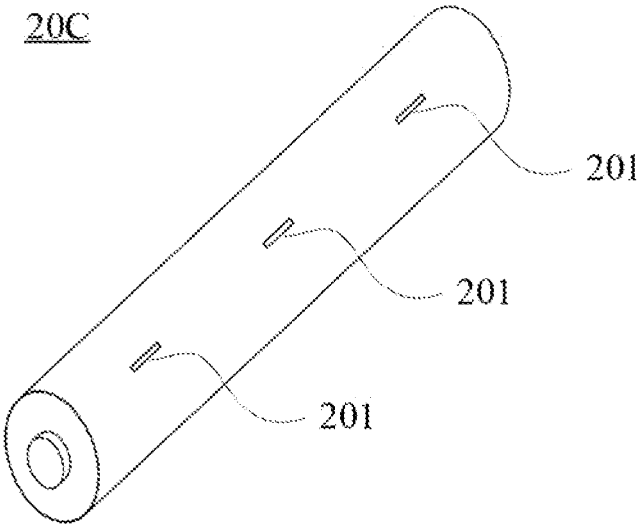
FIG. 7 is a schematic structural diagram of a third type of battery cell according to some embodiments of the present application.
Figure 8:
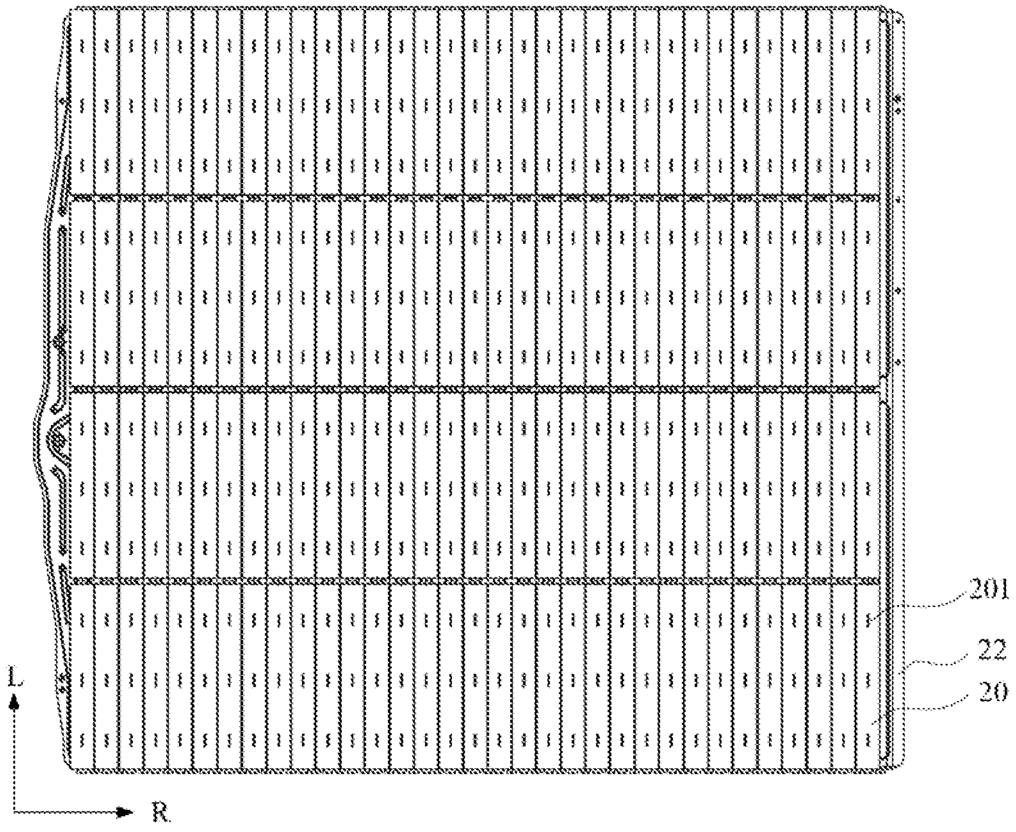
FIG. 8 is a schematic structural diagram of arrangement of a plurality of battery cells according to some embodiments of the present application.

The position and number of the pressure relief mechanisms 201 on each of the plurality of battery cells 20 may be the same, as shown in FIG. 7. A third type of battery cell 20C shown in FIG. 7 is provided with a plurality of pressure relief mechanisms 201 in the second direction L, and a plurality of third type of battery cells 20C are arranged in the first direction R. Since the openings 211 corresponding to the pressure relief mechanisms 201 of the two adjacent battery cells 20 are provided in the staggered manner on the protecting plate 21 according to the embodiments of the present application, after the protecting plate 21 is attached to the surface of the battery cell 20 provided with the pressure relief mechanism 201, only the pressure relief mechanism 201 corresponding to a position of the opening 211 of the protecting plate 21 can be exposed via the opening 211 of the protecting plate 21, and the pressure relief mechanism 201 not corresponding to the position of the opening 211 of the protecting plate 21 is covered by the protecting plate 21.

When the pressure or temperature inside the battery cell 20 reaches the threshold value, the high-temperature and high-pressure substances inside the battery cell 20 are more likely to be discharged from some of the pressure relief mechanisms 201 corresponding to the openings 211, and are less likely to be discharged from the pressure relief mechanisms 211 covered by the protecting plate 21, such that the high-temperature and high-pressure substances inside the battery cell 20 may be prevented from being directly sprayed onto the adjacent battery cell 20 when discharged from the staggered pressure relief mechanism 201, resulting in further thermal runaway issues. Therefore, the safety performance of the battery 10 can be ensured. At the same time, only one type of battery cell 20 needs to be designed in a production process, and the position of the pressure relief mechanism 201 is restricted by the opening 211 on the protecting plate 21, which simplifies the production process and can avoid a problem of wrong arrangement of different types of battery cells 20, increasing production efficiency.

According to some embodiments of the present application, optionally, the battery cell 20 is provided with at least three pressure relief mechanisms 201 in a second direction L, and the second direction L is perpendicular to the first direction R; and the pressure relief mechanisms 201 located at both ends of the second direction L of one of the two adjacent battery cells 20 in the first direction R are provided corresponding to the openings 211, and other pressure relief mechanisms 201 of the other of the two adjacent battery cells 20 in the first direction R are provided corresponding to the openings 211, except for the pressure relief mechanisms 201 located at both ends of the second direction L.

Figure 9:
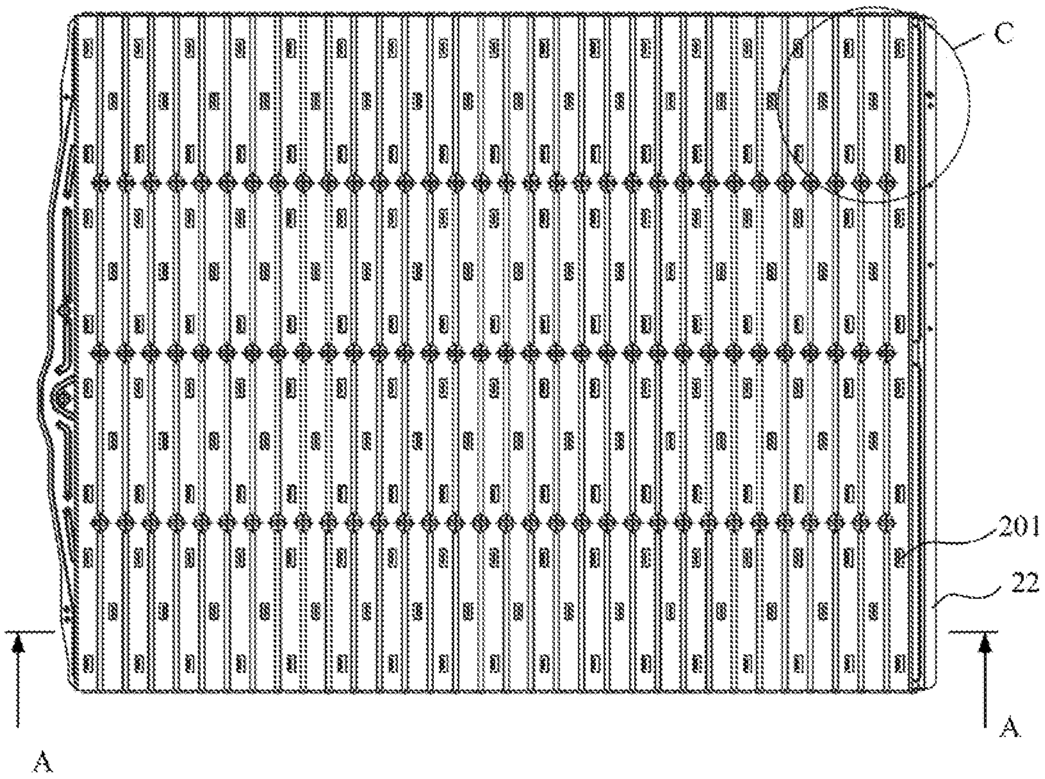
FIG. 9 is a schematic structural diagram of a protecting plate attached to a surface of a plurality of battery cells according to some embodiments of the present application.

Specifically, as shown in FIG. 7 to FIG. 10, the battery cell 20 may be, for example, the third type of battery cell 20C, and the third type of battery cell 20C may be provided with at least three pressure relief mechanisms 201 in the second direction L. Taking the third type of battery cell 20C as an example, the three pressure relief mechanisms 201 are provided in the second direction L, where the second direction L is perpendicular to the first direction R. Arranging the plurality of third type of battery cells 20C in the first direction R may obtain a row of battery cells 20 shown in FIG. 8, and arranging a plurality of rows of battery cells 20 in the second direction L may obtain a structure shown in FIG. 8. The structure shown in FIG. 9 may be obtained by attaching the protecting plate 21 to the structure shown in FIG. 8, and the enlarged part C in FIG. 9 is FIG. 10.

Figure 10:
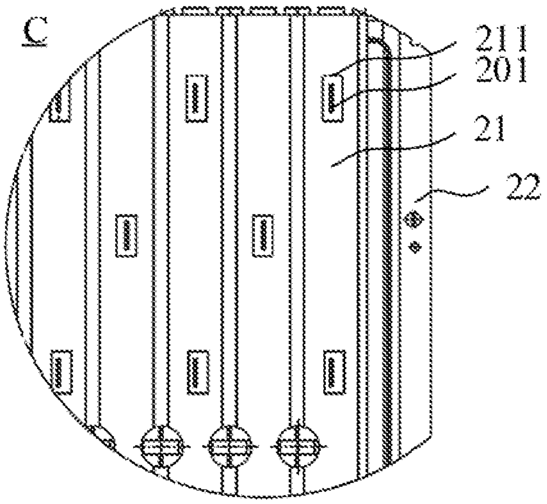
FIG. 10 is an enlarged view of part C in FIG. 9.

It can be seen from FIG. 9 and FIG. 10 that since the opening 211 of the protecting plate 21 is provided in the staggered manner as shown in FIG. 9 and FIG. 10, in the pressure relief mechanism 201 of the battery cell 20 exposed via the opening 211, the pressure relief mechanisms 201 located at both ends of the second direction L of one of the two adjacent battery cells 20 in the first direction R are provided corresponding to the openings 211, and the pressure relief mechanism 201 of the other of the two adjacent battery cells 20 in the first direction R is provided corresponding to the openings 211. When the third type of battery cell 20C is provided with more than three pressure relief mechanisms 201, the pressure relief mechanisms 201 located at both ends of the second direction L of one of the two adjacent battery cells 20 in the first direction R are provided corresponding to the openings 211, and other pressure relief mechanisms 201 of the other of the two adjacent battery cells 20 in the first direction R are provided corresponding to the openings 211, except for the pressure relief mechanisms 201 located at both ends of the second direction L.

The battery cell 20 is provided with at least three pressure relief mechanisms 201 to ensure that a sufficient number of pressure relief mechanisms 201 are exposed via the openings 211, such that when the internal pressure or temperature of the battery cell 20 reaches the threshold value, the pressure inside the battery cell 20 can be quickly released through the sufficient number of pressure relief mechanisms 201 to avoid a more serious explosion. At the same time, restricting the position of the pressure relief mechanisms 201 exposed via the openings 211 in the two adjacent battery cells 20 can prevent the discharged high-temperature and high-pressure substances from being directly sprayed onto the adjacent battery cell 20 after the pressure relief mechanism 201 in the battery cell 20 is actuated. In particular, it can enhance the safety performance of the battery 10 by preventing the high-temperature and high-pressure substances from being directly sprayed onto the staggered opening 211 on the adjacent battery cell 20, resulting in further thermal runaway issues.

According to some embodiments of the present application, optionally, the plurality of the battery cells 20 are bonded to the protecting plate 21.

The heat protecting plate 21 may be bonded to the plurality of battery cells 20, for example, an adhesive may be coated on one side of the heat protecting plate 21 facing the battery cell 20, such that when the protecting plate 21 is attached to the surface of battery cell 20, it can be bonded to the battery cell 20 with the adhesive.

By bonding the protecting plate 21 to the battery cell 20, the plurality of the battery cells 20 may be fixed by the protecting plate 21, so as to improve strength of the battery cell 20 and a battery cell group formed by the plurality of battery cells 20. At the same time, after being bonded to the battery cell 20, the protecting plate 21 is not likely to fall off due to impact when the pressure relief mechanism 201 releases the high-temperature and high-pressure substances inside the battery cell 20, such that the high-temperature and high-pressure substances inside the battery cell 20 is only discharged from the pressure relief mechanism 201 corresponding to the opening 211, and the high-temperature and high-pressure substances inside the battery cell 20 are prevented from being directly sprayed onto the adjacent battery cell 20 as much as possible, resulting in further thermal runaway issues. Therefore, the safety performance of the battery 10 can be ensured.

According to some embodiments of the present application, optionally, the pressure relief mechanism 201 is a weakened portion provided on a surface of the battery cell 20, such that when the internal pressure or temperature of the battery cell 20 reaches the threshold value, the weakened portion is ruptured to relieve the internal pressure.

The weakened portion may be, for example, a notch on the surface of the battery cell 20. In a possible embodiment, the weakened portion may be a structure that is recessed toward an axis of the battery cell 20, or the weakened portion may also be other commonly used structures in the art, such as breakpoints, local shear thinning. Compared with other parts of a housing of the battery cell 20, the weakened portion is likely to be destroyed. When the internal pressure or temperature of the battery cell 20 reaches the threshold value, it is also likely to discharge the high-temperature and high-pressure substances inside the battery cell 20 from the weakened portion to release the pressure inside the battery cell 20.

The process of providing the weakened portion on the surface of the battery cell 20 is relatively simple and the cost is low. At the same time, when the pressure or temperature inside the battery cell 20 reaches the threshold value, it is likely to be destroyed, and the pressure or temperature inside the battery cell 20 can be released in time to avoid a more dangerous explosion. Therefore, the safety performance of the battery cell 20 can be ensured.

According to some embodiments of the present application, optionally, the protecting plate 21 is made of a heat insulating material.

In order to further avoid further thermal runaway issues caused by the high-temperature and high-pressure substances discharged from the battery cell 20 being sprayed onto the surface of the adjacent battery cell 20, the protecting plate 21 may be made of the heat insulating material to isolate heat of the high-temperature and high-pressure substances.

When the high-temperature and high-pressure substances are sprayed onto a surface of the protecting plate 21, the protecting plate 21 made of the heat insulating material can prevent the heat carried by the high-temperature and high-pressure substances from being transferred to the surface of the battery cell 20 covered by the protecting plate 21, thereby avoiding further thermal runaway issues caused by the plurality of battery cells 20. Therefore, the safety performance of the battery 10 can be ensured.

According to some embodiments of the present application, optionally, the battery 10 further includes: a thermal management component 22 provided on one side of the plurality of battery cells 20 away from the protecting plate 21, where the thermal management component 22 is configured to accommodate a fluid to adjust temperature of the battery cell 20.

Figure 11:
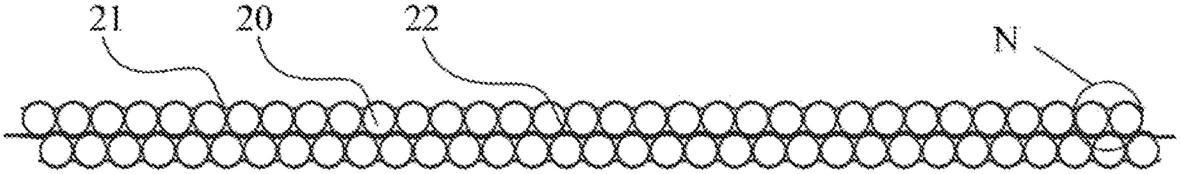
FIG. 11 is a sectional view of A-A direction in FIG. 9.
Figure 12:
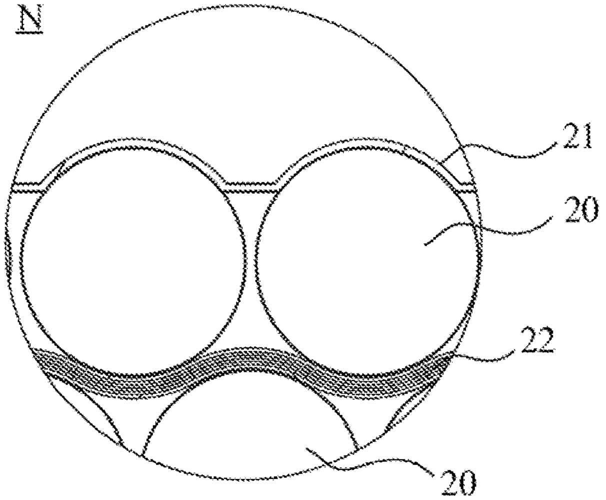
FIG. 12 is an enlarged view of part N in FIG. 11.

The battery 10 according to the embodiments of the present application may further include the thermal management component 22, the thermal management component 22 has a cavity structure that may contain a fluid to adjust the temperature of the plurality of battery cells 20. The fluid herein may be a liquid or a gas, and the temperature adjustment means heating or cooling the plurality of battery cells 20. In a case of cooling or lowering the temperature of the battery cell 20, the thermal management component 22 is configured to accommodate a cooling fluid to lower the temperature of the plurality of battery cells 20. In this case, the thermal management component 22 may also be called a cooling component, a cooling system or a cooling plate and the like. The fluid accommodated by the thermal management component 22 may also be called a cooling medium or a cooling fluid, and more specifically, may be called a cooling liquid or a cooling gas. In addition, the thermal management component 22 may also be configured to heat to rise the temperature of the plurality of battery cells 20, which is not limited by the embodiments of the present application. Optionally, the fluid may flow in a circulating manner to achieve a better temperature adjustment effect. Optionally, the fluid may be water, a mixture of water and ethylene glycol, or air and like. The thermal management component 22 is provided on the surface of the battery cell 20, since the surface of the battery cell 20 provided with the pressure relief mechanism 201 is covered with the protecting plate 21, the thermal management component 22 may be provided on one side of the battery cell 20 away from the protecting plate 21. In a possible embodiment, as shown in FIG. 11 and FIG. 12, when the battery cells 20 may be arranged in two layers in the third direction H, the heat management component 22 may be provided in the middle of the two layers of battery cells 20.

The thermal management component 22 may adjust the temperature of the battery cell 20 within a certain range, such that the battery 10 including the plurality of battery cells 20 can maintain the suitable temperature during use, improving the safety performance of the battery 10.

According to some embodiments of the present application, optionally, a surface shape of the thermal management component 22 matches a surface shape of the battery cell 20.

The surface of the thermal management component 22 may also have a shape that matches the surface shape of the battery cell 20. For example, when the battery cell 20 is in a cylinder shape, the surface of the thermal management component 22 may have a matching arc face, as shown in FIG. 11 and FIG. 12. FIG. 11 and FIG. 12 show a thermal management component 22 when two layers of battery cells 20 are provided in the battery 10 in the third direction H, where the two layers of battery cells 20 are provided alternately to save space, and a section of the thermal management component 22 in its thickness direction has a wavy shape, while matching the surface shape of the battery cells 20 on both surfaces of the thermal management component 22.

In this way, a contact area between the surface of the thermal management component 22 and the surface of the battery cell 20 is larger, which is more conducive to adjusting the temperature of the battery cell 20, such that the battery cell 20 can maintain the suitable temperature during the use, ensuring the safety performance of the battery 10 including the plurality of battery cells 20 during the use. At the same time, it can also save the space inside the battery 10, which is conducive to improving energy density of the battery 10.

According to some embodiments of the present application, the present application further provides a power consumption apparatus, including the battery 10 of any one of the above solutions, where the battery 10 is configured to supply electrical energy to a power consumption device.

The battery cell 20, the battery 10, and the power consumption apparatus according to the embodiments of the present application are described above, and a method and an apparatus for preparing a battery cell 20 according to the embodiments of the present application will be described below in combination with FIG. 13 and FIG. 14. For the parts that are not described in detail, reference is made to the foregoing embodiments.

Figure 13:
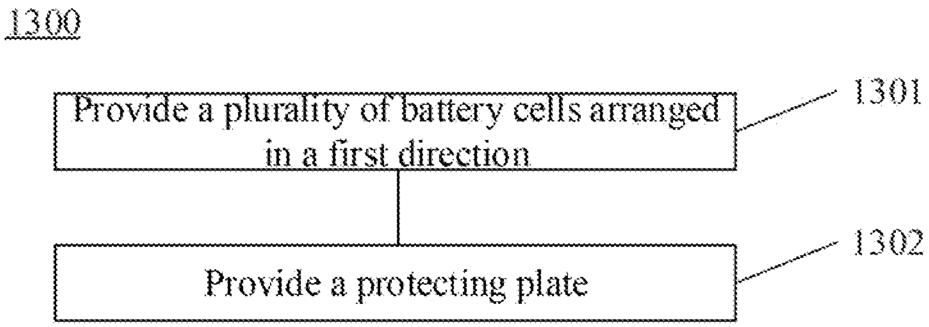
FIG. 13 is a schematic flowchart of a method for preparing a battery according to some embodiments of the present application.

FIG. 13 is a schematic flowchart of a method for preparing a battery 10 according to some embodiments of the present application. As shown in FIG. 13, the method 1300 may include:

1301, providing a plurality of battery cells 20 arranged in a first direction R, where the battery cell 20 is provided with a pressure relief mechanism 201, configured to be actuated when internal pressure or temperature of the battery cell 20 reaches a threshold value, to relieve the internal pressure; and

1302, providing a protecting plate 21, where the protecting plate 21 is attached to a surface of the battery cell 20 provided with the pressure relief mechanism 201 to protect the battery cell 20, the protecting plate 21 is provided with a plurality of openings 211, and an opening 211 is provided corresponding to the pressure relief mechanism 201 to expose the pressure relief mechanism 201 via the opening 211, and two openings 211 corresponding to the pressure relief mechanisms 201 of two adjacent battery cells 20 are provided in a staggered manner in the first direction R.

Figure 14:
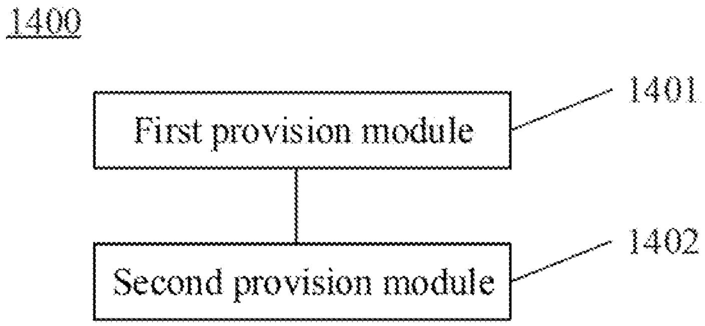
FIG. 14 is a schematic block diagram of an apparatus for preparing a battery according to some embodiments of the present application.

FIG. 14 is a schematic block diagram of an apparatus for preparing a battery cell 20 according to some embodiments of the present application. As shown in FIG. 14, the apparatus 1400 may include:

a first provision module 1401 configured to provide a plurality of battery cells 20 arranged in a first direction R, where the battery cell 20 is provided with a pressure relief mechanism 201, configured to be actuated when internal pressure or temperature of the battery cell 20 reaches a threshold value, to relieve the internal pressure; and a second provision module 1402 configured to provide a protecting plate 21, where the protecting plate 21 is attached to a surface of the battery cell 20 provided with the pressure relief mechanism 201 to protect the battery cell 20, the protecting plate 21 is provided with a plurality of openings 211, and an opening 211 is provided corresponding to the pressure relief mechanism 201 to expose the pressure relief mechanism 201 via the opening 211, and two openings 211 corresponding to the pressure relief mechanisms 201 of two adjacent battery cells 20 are provided in a staggered manner in the first direction R.

Although the present application has been described with reference to the preferred embodiments thereof, various modifications can be made thereto without departing from the scope of the present application, and the components therein can be replaced with equivalents. In particular, the technical features mentioned in each embodiments can be combined in any manner, as long as there is no structural conflict. The present application is not limited to the specific embodiments disclosed herein, but includes all technical solutions falling within the scope of the claims.

What is claimed is:

1. A battery, comprising:

a plurality of battery cells arranged in a first direction, wherein each battery cell is provided with a pressure relief mechanism, configured to be actuated when internal pressure or temperature of the battery cell reaches a threshold value, to relieve the internal pressure; and a protecting plate, wherein the protecting plate is attached to a surface of the battery cells arranged in the first direction, the protecting plate comprises a plurality of openings, and an opening is provided corresponding to a pressure relief mechanism of a battery cell, to expose the pressure relief mechanism of the battery cell via the opening, and two openings corresponding to pressure relief mechanisms of two adjacent battery cells are provided in a staggered manner in the first direction;

wherein among the plurality of pressure relief mechanisms provided to the plurality of battery cells, some of the pressure relief mechanisms are provided corresponding to the openings of the protecting plate, and others of the pressure relief mechanisms are covered by the protecting plate.

2. The battery according to claim 1, wherein each battery cell is provided with at least three pressure relief mechanisms in a second direction, and the second direction is perpendicular to the first direction; and the pressure relief mechanisms located at both ends of the second direction of one of the two adjacent battery cells in the first direction are provided corresponding to the openings, and other pressure relief mechanisms of the other of the two adjacent battery cells in the first direction are provided corresponding to the openings, except for the pressure relief mechanisms located at both ends of the second direction.

3. The battery according to claim 1, wherein the battery cell has an arc-shaped outer wall, the pressure relief mechanism is provided on the arc-shaped outer wall, the protecting plate is provided with an arc-shaped portion, and the arc-shaped portion matches with the arc-shaped outer wall.

4. The battery according to claim 1, wherein the position and number of the pressure relief mechanisms provided on each of the plurality of battery cells are the same.

5. The battery according to claim 1, wherein the plurality of battery cells are bonded to the protecting plate.

6. The battery according to claim 1, wherein the pressure relief mechanism is a weakened portion provided on a surface of the battery cell, such that when the internal pressure or temperature of the battery cell reaches the threshold value, the weakened portion is ruptured to relieve the internal pressure.

7. The battery according to claim 1, wherein the protecting plate is made of a heat insulating material.

8. The battery according to claim 1, wherein the battery further comprises:

a thermal management component provided on one side of the plurality of battery cells away from the protecting plate, wherein the thermal management component is configured to accommodate a fluid to adjust temperature of the battery cells.

9. The battery according to claim 8, wherein a surface shape of the thermal management component matches a surface shape of the battery cells.

10. A power consumption apparatus, comprising the battery according to claim 1, wherein the battery is configured to supply electrical energy to the power consumption apparatus.

11. A method for preparing a battery, comprising:

providing a plurality of battery cells arranged in a first direction, wherein each battery cell is provided with a pressure relief mechanism, configured to be actuated when internal pressure or temperature of the battery cell reaches a threshold value, to relieve the internal pressure; and providing a protecting plate, wherein the protecting plate is attached to a surface of the battery cells arranged in the first direction, the protecting plate comprises a plurality of openings, and an opening is provided corresponding to a pressure relief mechanism of a battery cell, to expose the pressure relief mechanism of the battery cell via the opening, and two openings corresponding to pressure relief mechanisms of two adjacent battery cells are provided in a staggered manner in the first direction;

wherein among the plurality of pressure relief mechanisms provided to the plurality of battery cells, some of the pressure relief mechanisms are provided corresponding to the openings of the protecting plate, and others of the pressure relief mechanisms are covered by the protecting plate.

12. An apparatus for preparing a battery, comprising:

a first provision module, configured to arrange a plurality of battery cells in a first direction, wherein each battery cell is provided with a pressure relief mechanism, configured to be actuated when internal pressure or temperature of the battery cell reaches a threshold value, to relieve the internal pressure; and a second provision module, configured to attach a protecting plate to a surface of the battery cells arranged in the first direction, the protecting plate comprises a plurality of openings, and an opening is provided corresponding to a pressure relief mechanism of a battery cell, to expose the pressure relief mechanism of the battery cell via the opening, and two openings corresponding to pressure relief mechanisms of two adjacent battery cells are provided in a staggered manner in the first direction;

wherein among the plurality of pressure relief mechanisms provided to the plurality of battery cells, some of the pressure relief mechanisms are provided corresponding to the openings of the protecting plate, and others of the pressure relief mechanisms are covered by the protecting plate.

* * * * *